Aug. 22, 1967

T. L. FAWICK 3,336,765

FLEXIBLE COUPLING

Filed Oct. 22, 1965

INVENTOR.
THOMAS L. FAWICK
BY
Ely, Golrick & Flynn
ATTORNEYS

Aug. 22, 1967
T. L. FAWICK
3,336,765
FLEXIBLE COUPLING
Filed Oct. 22, 1965
2 Sheets-Sheet 2
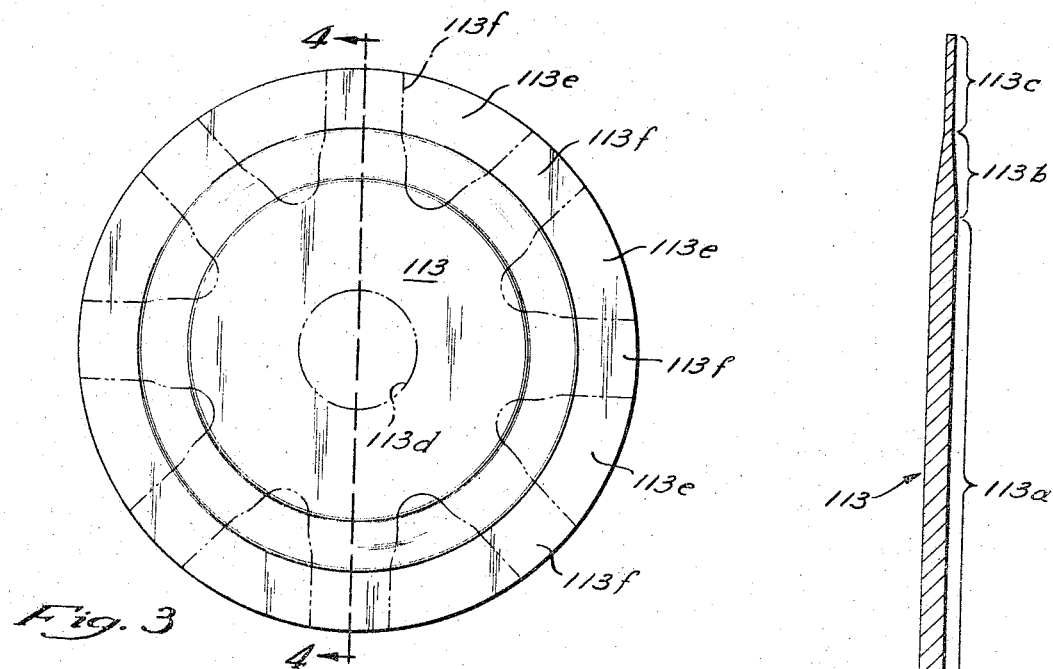
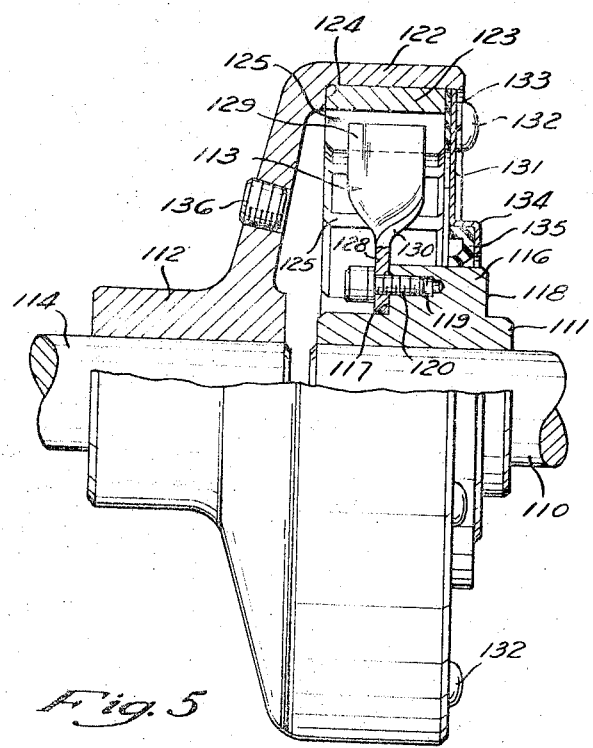
INVENTOR.
THOMAS L. FAWICK
BY
Ely, Gilrick & Flynn
ATTORNEYS

United States Patent Office 3,336,765
Patented Aug. 22, 1967

3,336,765
FLEXIBLE COUPLING
Thomas L. Fawick, Shaker Heights, Ohio, assignor to Fawick Corporation, a corporation of Michigan
Filed Oct. 22, 1965, Ser. No. 502,208
6 Claims. (Cl. 64—15)

ABSTRACT OF THE DISCLOSURE

A flexible coupling comprises substantially concentric outer and inner coupling structures and one or more spring plates engaged between them. The spring plate has a radially inward annular portion disposed perpendicular to the axis of the coupling and rigidly attached to the inner coupling structure. The spring plate also has circumferentially spaced, resilient and flexible fingers which are received in longitudinally extending, internal grooves in the outer coupling structure. The spring plate has 90°-twisted segments which integrally connect these fingers to its radially inward portion.

---

This invention relates to a flexible coupling for transmitting torque between two rotatable members, such as two shafts which are in approximate alignment.

The principal object of this invention is to provide a novel and improved flexible coupling in which torque is transmitted between two rotatable coupling members through a spring plate arrangement of novel construction.

Another object of this invention is to provide such a coupling in which the torque-transmitting spring plate arrangement has maximum rigidity, in the circumferential direction in which torque is transmitted, where the torque loading is the greatest, and has maximum flexibility transverse to both the longitudinal axis and the circumferential extent of the coupling where the torque loading is less severe.

Another object of this invention is to provide such a coupling in which the torque-transmitting spring plate arrangement is positively retained on the inner coupling member against radial or axial movement.

Another object of this invention is to provide a novel and improved flexible coupling of rugged, compact construction.

Further objects and advantages of this invention will be apparent from the following detailed description of two presently-preferred embodiments thereof, which are illustrated in the accompanying drawings.

In the drawings:

FIGURE 3 is an elevational view showing a blank for a spring plate for use in the present coupling in accordance with a second embodiment of this invention;

FIGURE 4 is a cross-section taken along the line 4—4 in FIG. 3; and

FIGURE 5 is a view partly in axial section and partly in side elevation showing this second embodiment of the present coupling.

Figure 2:
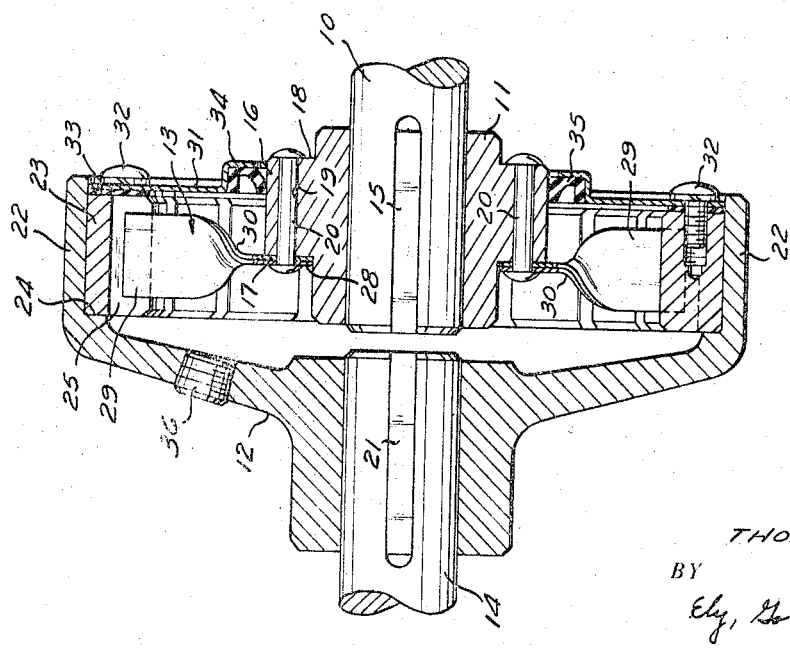
FIGURE 2 is an axial section taken along the line 2—2 in FIG. 1.

Referring first to FIG. 2, the flexible coupling shown therein comprises a first rotatable shaft 10, an inner coupling structure in the form of a rigid annular body 11 carried by shaft 10, an outer coupling structure comprising a rigid, generally cup-shaped body 12 and an internally grooved ring 23 flexibly and resiliently coupled to the inner coupling structure 11 through one or more novel torque-sustaining spring plates 13, to be described, and a second shaft 14 carrying the outer coupling body 12 and disposed in approximate axial alignment with the first shaft 10.

The inner coupling structure 11 is coupled to the first shaft 10 by a longitudinal key 15, which rigidly imparts rotation between them. The inner coupling structure 11 has an annular peripheral flange 16, which presents an axially inwardly-facing, flat, annular, radially disposed end face 17. The opposite end of this flange presents a similar outwardly facing end face 18. This flange 16 is formed with a plurality of circumferentially spaced openings 19 which extend between its opposite end faces 17 and 18 for the reception of respective rivets 20. These rivets hold the annular, radially inward portions of the spring plates 13 against the end face 17 on the inner coupling member 11.

Body 12 of the outer coupling structure is coupled to the second shaft 14 by a longitudinal key 21 which rigidly imparts rotation between them. At its axially inward (right) end in FIG. 2, the body 12 presents an integral annular flange 22. Secured to the inside of this flange 22 is a rigid coupling ring 23, which also is part of the outer coupling structure. The left end of this ring abuts against an outwardly facing annular shoulder 24 at the inner end of flange 22. The ring 23 is rigidly secured to flange 22, preferably by a suitable adhesive.

Figure 1:
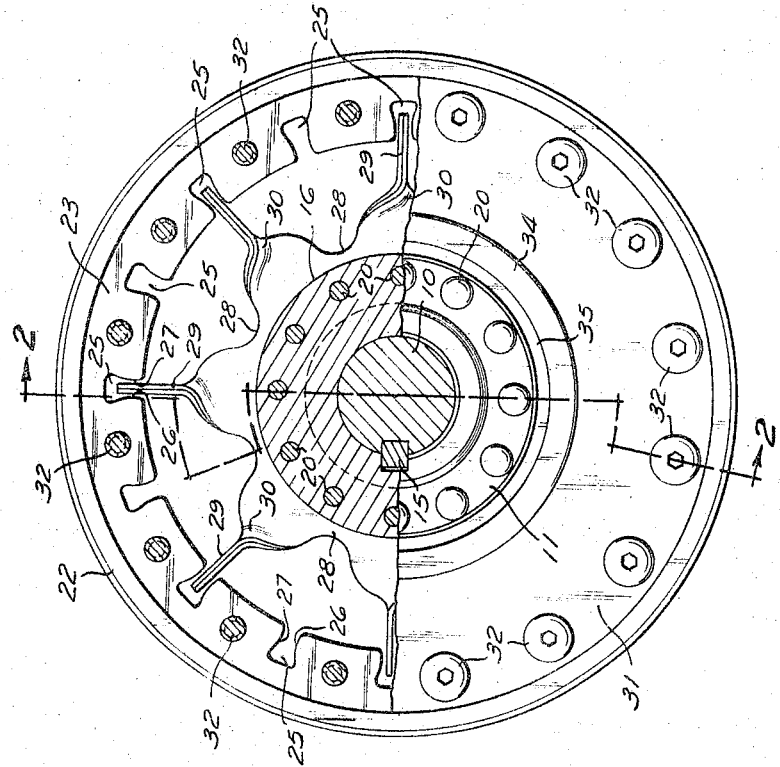
FIGURE 1 is a view of a flexible coupling in accordance with a first embodiment of the present invention, with the lower half in end elevation and with the upper half having an end plate of the coupling removed for clarity.

As shown in FIG. 1, the ring 23 presents a plurality of circumferentially spaced, longitudinally extending grooves or recesses 25. Preferably each of these grooves extend the full axial length of ring 23 and parallel to the rotational axis of the second shaft 14. Each of these grooves presents at its open, radially inward end a pair of confronting, oppositely curved, convex faces 26 and 27. Radially outward from these faces 26 and 27 each groove 25 is enlarged circumferentially.

In accordance with the present invention, each torque-sustaining spring plate 13, which transmits torque between the inner coupling structure 11 and the outer coupling structure 12, 23, is of relatively thin, flexible and resilient spring steel. Each of these plates has a radially inward annular portion 28, which encircles the inner axial end of the inner coupling structure 11 and is held by the rivets 20 against the inner end face 17 of the peripheral flange 16 on the latter and projects radially a short distance outwardly beyond this flange. As shown in FIG. 2, this radially inward portion 28 of each spring plate is thin longitudinally of the coupling and has its maximum stiffness circumferentially of the coupling.

Each spring plate also has a plurality of circumferentially spaced flexible and resilient tangs or fingers 29 whose outer ends are received respectively in the internal grooves 25 in ring 23, as shown in FIG. 1. Each of these fingers has its opposite major faces lying in a plane which is disposed radially and longitudinally of the coupling—that is, turned 90 degrees from the major faces of the annular radially inward portion 28 of the spring plate. The fingers are connected integrally to the radially inward portion 28 by connecting segments 30 which are twisted through 90 degrees. Either a single such spring plate 28–30 or any desired number of such spring plates lying flush against one another throughout may be provided, depending upon the desired torque rating of the coupling. The rivets 20 attach the radially inward, annular portion 28 of these spring plates rigidly to the inner coupling structure 11.

With this arrangement, where the torque loading is greatest (i.e., at the inner coupling structure), each spring plate has maximum stiffness and torque-sustaining capacity in a circumferential direction, that is, in the direction of the rotation of the coupling, because the major plane of its radially inward portion 28 is disposed radially and transverse to the axis of the coupling. On the other hand, at its radially outward periphery (i.e., at the tangs or fingers 29), where the torque loading is lower because of the greater radial distance from the rotational axis of the coupling, each spring plate has maximum flexibility, both circumferentially and longitudinally of the coupling. That is, these spring fingers or tangs 29, because of their appreciable radial extent, are able to flex a substantial amount circumferentially under load, particularly when the drive shaft is started up, so that torque is transmitted through the coupling to the driven shaft without shock loading. Also, due to the appreciable longitudinal extent of these spring fingers or tangs 29 they are able to flex about a radial centerline in a direction transverse to the longitudinal axis of the coupling and also transverse to the circumferential extent of the coupling so as to accommodate misalignment of the respective rotational axes of the two shafts without significantly impairing the operation of the coupling. When these spring fingers flex, their radially outer ends can slide in the grooves 25 on the ring 23 of the outer coupling structure and at the same time the radially inward portion 28 of the spring plate remains tightly clamped, both radially and axially, to the inner coupling structure 11. The several spring fingers or tangs 29 on each spring plate are identical and are evenly spaced apart circumferentially so that they share the torque substantially equally and no single one of them is subjected to excessive stress. Even in the event of breakage of one or more of these spring fingers the others can assume increased individual torque loads without excessive stress on any particular one of them.

As already stated, the torque capacity of the present coupling may be selectively varied by decreasing or increasing the number of spring plates 13 in the coupling.

As shown in FIG. 1, the ring 23 in the outer coupling structure has twice as many internal grooves 25 as the number of fingers 29 on the spring plates. If desired, the unoccupied grooves in FIG. 1 may be wide enough to accommodate the fingers of a three-plate spring plate assembly, so that this same ring 23 may be used either for a two-plate assembly, as shown, or for a three-plate assembly.

An annular end closure plate 31 (FIG. 2) is attached to the ring 23 on the outer coupling structure by a plurality of bolts 32. An annular sealing gasket 33 is engaged between this end plate 31 and the end face of ring 23. The radially inward end of this closure plate 31 presents an axially offset flange 34 which carries a resilient sealing ring 35 of rubber-like material which sealingly engages the outside of the peripheral flange 16 on the inner coupling structure 11. This end plate and seal arrangement provides a liquid-tight closure for this end of the coupling. A screw-threaded plug 36 in the opposite end wall of the outer coupling member 12 is removable to enable the introduction of a suitable lubricant into the interior of the coupling.

In the operation of this coupling, either shaft 10 or 14 may be the drive shaft and the other the driven shaft. The one or more spring plates 13 constitute a flexible and resilient drive coupling for imparting rotation between the outer and inner coupling structures as described.

FIGS. 3-5 show a second embodiment of the present invention in which only a single spring plate is provided, having a reduced thickness toward its outer periphery for increased flexibility where the torque load is smaller and having a substantially greater thickness toward its inside periphery where the torque load is greatest.

This spring plate 113 initially is circular in outline, as shown in FIG. 3 and it is formed with the cross-section shown in FIG. 4, having a uniform maximum thickness at a central region 113a, a progressively decreasing thickness radially outward in an annular intermediate region 113b immediately surrounding the central region 113a, and a uniform minimum thickness in an annular outer peripheral region 113c immediately surrounding the intermediate region 113b.

As shown in phantom in FIG. 3, the spring plate 113 is then formed with a central opening 113d and is cut away at a plurality of circumferentially spaced locations 113e around its periphery to form radial fingers 113f between these cut-away portions. After being heat treated and tempered, the plate is then twisted at each of these fingers to provide the outer fingers 129 (FIG. 5), which correspond to the fingers 29 in FIGS. 1 and 2, and the twisted connecting segments 130, which correspond to the segments 30 in FIGS. 1 and 2. These twisted connecting segments 130 have the tapered cross-section shown at 113b in FIG. 4 The outer fingers 129 have a substantial extent both longitudinally and radially of the coupling and are thin circumferentially so as to be flexible under torque loading. The major plane of these fingers 129 is substantially perpendicular to that of the thicker, radially and transversely disposed central section 128 of the plate, which is rigidly attached by bolts 120 to the end face 117 of the flange 116 on the inner coupling structure 111.

In FIG. 5 corresponding elements of this coupling are given the same reference numerals, plus 100, as the elements in the coupling of FIGS. 1 and 2, and the detailed description of these elements need not be repeated.

While two presently-preferred embodiments of the invention have been described in detail and shown in the accompanying drawings, it is to be understood that various structural modifications, omissions and revisions which depart from the enclosed embodiments may be adopted without departing from the spirit and scope of this invention. For example, if desired, the spring fingers or tangs and the internal grooves in the outer coupling structure may have their respective lengths disposed at an acute angle to the longitudinal axis of the coupling rather than parallel to that axis. Also, in either embodiment each spring plate, instead of being a one-piece structure, may be composed of separate pieces which are riveted or otherwise secured integrally to one another.

I claim:

1. A flexible coupling comprising a rotatable outer coupling structure, a rotatable inner coupling structure extending into said outer coupling structure and spaced radially therefrom, and one or more spring plates engaged between said coupling structures to impart rotation from one to the other, each said spring plate having a radially inward annular portion disposed transverse to the longitudinal axis of the coupling and rigidly attached to said inner coupling structure, a plurality of circumferentially spaced, resilient and flexible spring fingers and twisted segments which integrally connect said fingers to said radially inward portion, said fingers extending radially outward from said radially inward portion and being coupled to said outward coupling structure, said fingers being thin and flexible circumferentially, and said outer coupling structure having a plurality of circumferentially spaced, longitudinally extending, internal grooves which respectively receive the outer ends of said fingers.

2. A flexible coupling comprising a rotatable outer coupling structure, a rotatable inner coupling structure extending into said outer coupling structure and spaced radially therefrom, and at least one spring plate engaged between said coupling structures to transmit torque between them, said spring plate having a radially inward portion connected to said inner coupling structure and having a substantial extent circumferentially of the latter to sustain the torque thereat, a plurality of circumferentially spaced twisted segments connected to said radially inward portion and extending outward therefrom, and a plurality of circumferentially spaced resilient and flexible fingers connected to said twisted segments and extending radially outward from the latter coupled to said outer coupling structure, said fingers each having a substantial extent both longitudinally and radially of the coupling and being thin circumferentially so as to be flexible circumferentially and flexible transverse to both the length and the circumferential extent of the coupling.

3. A flexible coupling according to claim 2, wherein said radially inward portion of said spring plate is disposed transverse to the longitudinal axis of the coupling and is rigidly attached to said inner coupling structure, and said outer coupling structure has a plurality of circumferentially spaced, longitudinally extending, internal grooves which respectively receive the outer ends of said fingers.

4. A flexible coupling according to claim 3, wherein there are a plurality of said spring plates contiguous to each other.

5. A flexible coupling according to claim 3, wherein there is only a single spring plate engaged between the coupling structures, said spring plate being substantially thicker at its radially inward portion than at said fingers.

6. A flexible coupling comprising a rotatable outer coupling structure having an annular portion with a plurality of longitudinally extending internal grooves, a rotatable inner coupling structure extending into said annular portion of the outer coupling structure and spaced radially inward from the latter, said coupling structures being approximately coaxial with one another, said inner coupling structure having a peripheral flange which presents an axially facing, radially disposed end face, and one or more spring plates having an annular, radially inward portion rigidly secured to said end face, said radially inward portion of the spring plate extending radially outward beyond said peripheral flange on the inner coupling structure, said spring plate having a plurality of circumferentially spaced segments connected to said radially inward portion and extending radially outward therefrom and being twisted through substantially 90 degrees, and a plurality of flexible and resilient fingers respectively connected integrally to the outer ends of said segments and extending radially outward therefrom into said internal grooves in the outer coupling structure, each of said fingers having a substantial extent both radially and longitudinally of the coupling and being thin circumferentially so as to be flexible circumferentially and flexible transverse to both the length and the circumferential extent of the coupling.

References Cited

UNITED STATES PATENTS

| 2,053,849 | 9/1936 | Spase | 64—27 |
| 2,363,257 | 11/1944 | Matteucci | 64—15 |

FOREIGN PATENTS

| 508,452 | 6/1939 | Great Britain. |
| 561,192 | 5/1944 | Great Britain. |
| 561,427 | 5/1944 | Great Britain. |

FRED C. MATTERN, Jr., *Primary Examiner.*

HALL C. COE, *Examiner.*